(12) United States Patent
Tripathi et al.

(10) Patent No.: US 11,270,073 B2
(45) Date of Patent: Mar. 8, 2022

(54) METHOD AND SYSTEM FOR EXTRACTING ENTITY INFORMATION FROM TARGET DATA

(71) Applicant: Innoplexus AG, Eschborn (DE)

(72) Inventors: Gaurav Tripathi, Pune (IN); Vatsal Agarwal, Rampur (IN); Prashant Patil, Pune (IN); Girish Kumar, Bangalore (IN); Tapashi Mandal, Baruipur (IN); Sudhanshu Shekhar, Patna (IN)

(73) Assignee: Innoplexus AG, Eschborn (DE)

( * ) Notice: Subject to any disclaimer, the term of this patent is extended or adjusted under 35 U.S.C. 154(b) by 132 days.

(21) Appl. No.: 16/233,736

(22) Filed: Dec. 27, 2018

(65) Prior Publication Data
US 2019/0205378 A1   Jul. 4, 2019

(30) Foreign Application Priority Data
Dec. 30, 2017 (GB) .................................. 1722306

(51) Int. Cl.
*G06F 40/295* (2020.01)
*G06F 40/30* (2020.01)

(52) U.S. Cl.
CPC ............ *G06F 40/295* (2020.01); *G06F 40/30* (2020.01)

(58) Field of Classification Search
CPC ............ G06F 16/24578; G06F 16/285; G06F 16/353; G06F 16/367; G06F 3/0622; G10L 25/51; G10L 2015/088; G10L 25/78; G10L 25/84
See application file for complete search history.

(56) References Cited

U.S. PATENT DOCUMENTS

| | | | |
|---|---|---|---|
| 9,535,902 B1 * | 1/2017 | Michalak | G06F 40/30 |
| 2019/0130028 A1 * | 5/2019 | Rajpathak | G06Q 10/20 |

\* cited by examiner

*Primary Examiner* — Matthew H Baker
(74) *Attorney, Agent, or Firm* — Ziegler IP Law Group, LLC

(57) ABSTRACT

Disclosed is a method and a system for extracting entity information from target data. The method comprises: providing the target data; refining the target data to obtain at least one base entity information having a plurality of base entity units using an algorithm, wherein the algorithm is based on a predefined syntax; generating a plurality of strings for each of the base entity information, wherein the plurality of strings comprises at least one base entity unit among the plurality of base entity units; sorting the plurality of strings in a decreasing order of length of the plurality of strings; identifying an entity type of the plurality of strings, based on an ontology, by processing the plurality of strings sequentially; assigning labels to the plurality of strings based on the entity type; and mapping the labelled plurality of strings to a predefined signature to obtain the entity information.

10 Claims, 2 Drawing Sheets

---

100

| DATABASE ARRANGEMENT 102 | PROCESSING MODULE 104 |

METHOD AND SYSTEM FOR EXTRACTING ENTITY INFORMATION FROM TARGET DATA

CROSS-REFERENCE TO RELATED APPLICATIONS

This application claims the benefit under 35 U.S.C. § 119(a) and 37 CFR § 1.55 to UK Patent Application No. GB1722306.6, filed on Dec. 30, 2017, the entire content of which is incorporated herein by reference.

TECHNICAL FIELD

The present disclosure relates generally to data processing; and more specifically, to methods and systems for extraction of contextually relevant content from a target database. Moreover, the present disclosure also relates to computer readable medium containing program instructions for execution on a computer system, which when executed by a computer, cause the computer to perform method steps for extracting entity information from target data.

BACKGROUND

Generally, research plays a crucial role in advancing technological development in various fields. Specifically, research inspires innovation and promotes learning in community of scientists and inventors. Moreover, multiple platforms act as information sources for researchers. Conventionally, printed media (such as books, encyclopedias, and so forth) were a primary information source of knowledge and content. However, with advancements in technology, digital media has now replaced the printed media as an information source with easy accessibility and improved availability.

Typically, information available on the digital media is available in multiple formats. Therefore, obtaining entity information (namely, content catering to needs of a user), from the information available on the digital media, may prove to be cumbersome and time consuming. Furthermore, the information available on the digital media is informative but not useful in its entirety. In an example, the entity information may include recent data that may not be present in public domain. In such an example, obtaining the entity information from the information available on the digital media may require manual efforts from the user. In such a case, the user may have to sift through hundreds of webpages to obtain content specific to needs thereof. Furthermore, the existing searching techniques employ a signature for identifying the entity information. However, if the information is structured in a different manner, the existing searching techniques may not be able to obtain a desired result.

Therefore, in light of the foregoing discussion, there exists a need to overcome the aforementioned drawbacks associated with the conventional method of extracting entity information.

SUMMARY

The present disclosure seeks to provide a method extracting entity information from target data. The present disclosure seeks to provide a system for extracting entity information from target data. Furthermore, the present disclosure seeks to provide a computer readable medium, containing program instructions for execution on a computer system, which when executed by a computer, cause the computer to perform method steps for extracting entity information from target data. The present disclosure seeks to provide a solution to the existing problem of contextually irrelevant and inefficient entity extraction techniques. An aim of the present disclosure is to provide a solution that overcomes at least partially the problems encountered in prior art, and provide a reliable and optimized method for extracting relevant entity information from target data.

In first aspect, an embodiment of the present disclosure wherein the method comprises:
providing the target data;
refining the target data to obtain at least one base entity information having a plurality of base entity units using an algorithm, wherein the algorithm is based on a predefined syntax;
generating a plurality of strings for each of the base entity information, wherein the plurality of strings comprises at least one base entity unit among the plurality of base entity units;
sorting the plurality of strings in a decreasing order of length of the plurality of strings;
identifying an entity type of the plurality of strings, based on an ontology, by processing the plurality of strings sequentially;
assigning labels to the plurality of strings based on the entity type; and
mapping the labelled plurality of strings to a predefined signature to obtain the entity information.

In second aspect, an embodiment of the present disclosure provides a system for extracting entity information from target data, wherein the system comprises:
a database arrangement operable to store the target data and an ontology; and
a processing module communicably coupled to the database arrangement, the processing module operable to
receive the target data;
refine the target data to obtain at least one base entity information having a plurality of base entity units using an algorithm, wherein the algorithm is based on a predefined syntax;
generate a plurality of strings for each of the base entity information, wherein the plurality of strings comprises at least one base entity unit among the plurality of base entity units;
sort the plurality of strings in a decreasing order of length of the plurality of strings;
identify an entity type of the plurality of strings, based on the ontology, by processing the plurality of strings sequentially;
assign labels to the plurality of strings based on the entity type; and
map the labelled plurality of strings a predefined signature to obtain the entity information.

In third aspect, an embodiment of the present disclosure provides a computer readable medium, containing program instructions for execution on a computer system, which when executed by a computer, cause the computer to perform method steps for extracting entity information from target data, the method comprising the steps of:
providing the target data;
refining the target data to obtain at least one base entity information having a plurality of base entity units using an algorithm, wherein the algorithm is based on a predefined syntax;

generating a plurality of strings for each of the base entity information, wherein the plurality of strings comprises at least one base entity unit among the plurality of base entity units;

sorting the plurality of strings in a decreasing order of length of the plurality of strings;

identifying an entity type of the plurality of strings, based on an ontology, by processing the plurality of strings sequentially;

assigning labels to the plurality of strings based on the entity type; and mapping the labelled plurality of strings to a predefined signature to obtain the entity information.

Embodiments of the present disclosure substantially eliminate or at least partially address the aforementioned problems in the prior art, and provides an efficient and reliable method and system for extracting entity information from target data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
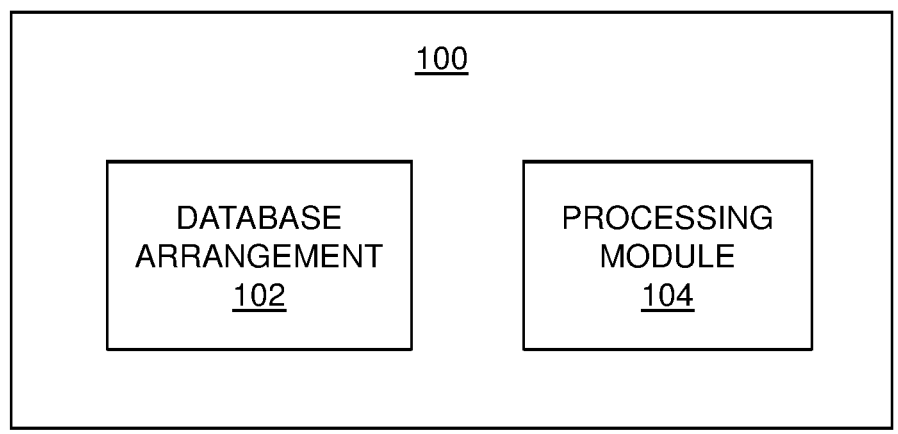
FIG. 1 is a block diagram of a system for extracting entity information from target data, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with extraction of entity information from target data and specifically to, obtaining entity information based on a predefined signature thereof.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for extracting entity information from target data, wherein the method comprises:

providing the target data;

refining the target data to obtain at least one base entity information having a plurality of base entity units using an algorithm, wherein the algorithm is based on a predefined syntax;

generating a plurality of strings for each of the base entity information, wherein the plurality of strings comprises at least one base entity unit among the plurality of base entity units;

sorting the plurality of strings in a decreasing order of length of the plurality of strings;

identifying an entity type of the plurality of strings, based on an ontology, by processing the plurality of strings sequentially;

assigning labels to the plurality of strings based on the entity type; and mapping the labelled plurality of strings to a predefined signature to obtain the entity information.

In another aspect, an embodiment of the present disclosure provides a system for extracting entity information from target data, wherein the system comprises:

a database arrangement operable to store the target data and an ontology; and a processing module communicably coupled to the database arrangement, the processing module operable to receive the target data;

refine the target data to obtain at least one base entity information having a plurality of base entity units using an algorithm, wherein the algorithm is based on a predefined syntax;

generate a plurality of strings for each of the base entity information, wherein the plurality of strings comprises at least one base entity unit among the plurality of base entity units;

sort the plurality of strings in a decreasing order of length of the plurality of strings;

identify an entity type of the plurality of strings, based on the ontology, by processing the plurality of strings sequentially;

assign labels to the plurality of strings based on the entity type; and map the labelled plurality of strings to a predefined signature to obtain the entity information.

The present disclosure seeks to provide a system and method for extracting entity information from target data and enables efficient and reliable extraction of entity information from target data. Beneficially, the present disclosure provides the predefined syntax for refining the target data. Beneficially, such predefined syntax allows for accurate extraction of the entity information. Moreover, the method comprises labelling the plurality of strings based on the entity type. Beneficially, labelling the plurality of strings reduces chances of misinterpretation regarding plurality of strings. Furthermore, mapping the plurality of strings based on the predefined signature allows for extracting entity information even if it is randomly arranged in the target data.

Throughout the present disclosure, the term "entity information" relates to information pertaining to a field of user's interest. Specifically, the entity information may be structured data (namely facts and/or figures) pertaining to the field of user's interest. More specifically, entity information may relate to information of an entity such as person, object, institution and so forth. Furthermore, the entity information may be in form of text, image, audio, video, or any combination thereof. Optionally, the entity information may be for research purposes, academic studies, market analyses and so forth. In an example, for a user who wants to carry out a research to develop a new drug for medical purposes; the entity information may be a pre-clinical name of a molecule that is not disclosed explicitly in public domain. However, such entity information may appear in public data such clinical trials and publications data. In another example, for a user who needs to make a project on hybridization of birds, the entity information may be most recent hybrid species of the birds that are currently being researched on and are not disclosed in public domain.

Throughout the present disclosure, the term "target data" relates to data that needs to be analysed in order to obtain entity information. Specifically, the target data may be asymmetrical, unstructured and/or unordered. Optionally, the target data may be in a portable document format (PDF), web page, Joint Photographic Experts Group. (JPEG) fie, MS-WORD file and/or a combination thereof. In an example, for the user who wants to carry out the research to develop a new drug for medical purposes, the target data may be a document having various clinical trials data. In such example, the entity information may be extracted from such target data. In another example, for the user who needs to make a project on hybridization of birds the target data may be a database including information about recent developments in the birds that are not stored in any public database. Optionally the target data may be a universal resource locator (URL). It will be appreciated that the target data and the entity information may differ for different users.

As mentioned previously, the method comprises providing the target data. Specifically, the target data is provided to the processing module via the database arrangement. The processing module is operable to receive the target data as an input and produce the entity information as output thereof.

The system for extracting entity information comprises the database arrangement operable to store target data. The database arrangement is operable to store target data. Optionally, the database arrangement is operable to store user-specific content. Furthermore, the database arrangement may be a relational or NoSQL database.

Throughout the present disclosure, the term "database arrangement" as used herein relates to an organized body of digital information regardless of the manner in which the target data or an organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement refers to the software program for creating and managing one or more databases. Optionally, the database arrangement is operable to supports relational operations, regardless of whether it enforces strict adherence to the relational model, as understood by those of ordinary skill in the art. Additionally, optionally, the database arrangement is populated by data elements. Furthermore, the data elements may include data records, bits of data, cells are used interchangeably herein and all intended to mean information stored in cells of a database.

Furthermore, as mentioned previously, the system for extracting the entity information from the target data comprises the processing module communicably coupled to the database arrangement. The processing module is operable to receive the target data from the database arrangement.

Throughout the present disclosure, the term "processing module" used herein relates to a computational element that is operable to respond to and process instructions that carry out the method. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, optionally, the processing module may refer to one or more individual processors, processing devices and various elements associated with a processing device that may be shared by other processing devices. Additionally, the one or more individual processors, processing devices and elements are arranged in various architectures for responding to and processing the instructions that drive the system. Optionally, the processing module comprises a communication module. In such a case, the communication module enables an exchange of the target data and the entity information. In an example, the processing module may classify list of clinical trials as the input (namely, target data) and may provide list of pre-clinical name of a molecule that is not disclosed in public domain (namely, entity information).

Optionally, the processing module may be a computer-implemented module. More optionally, the target data may be provided by means of a graphical user interface (GUI), command line (cmd), drag and drop, and so forth.

As mentioned previously, the method of extracting the entity information comprises refining the target data to obtain the at least one base entity information having the plurality of base entity units using the algorithm, wherein the algorithm is based on the predefined syntax. Refining of the target data relates to removing unwanted information (for example, such as the information not desired by the user) from the target data. Specifically, the processing module is configured to refine the target data to obtain the at least one base entity information having the plurality of base entity units using the algorithm, wherein the algorithm is based on the predefined syntax. The algorithm is stored in the processing module. In such a case, the processing module may comprise a memory unit for storing the algorithm therein. Optionally, the predefined syntax may be defined based on the entity information during defining of the algorithm.

Furthermore, the term "predefined syntax" used herein relates to an arrangement of various elements (such as words) in the target data. In an example, if the target data is the clinical trial data, the processing module may use the algorithm having the predefined syntax to refine the target data to obtain the at least one base entity information.

Optionally, the predefined syntax is defined by arrangement of the various elements with respect to punctuations. For example, a particular word arranged in a manner which is similar to the predefined syntax may be used to obtain the at least one base entity information, whilst other words or phrases may be removed or added according to the predefined syntax. The predefined syntax is used to split the text into multiple logical sentences wherein each sentence holds information about the drug. In an example, a clinical trial data may contain "Riboflaxivin 5 mg per day, Citrizine 1 tablet twice a day". In such an example, the above-mentioned clinical trial data is split into two statements based on the punctuation.

Throughout the present disclosure, the term "at least one base entity information" used herein relates to a section of information having the entity information. In an example, for the user working on the research to develop a new drug for medical purposes, the target data may be clinical trials data. In such an example, the clinical trial data may include various information for example, such a subject's (namely, person on whom the clinical trials are being conducted) names, subject's daily routine, name of drugs given to the subject and the like. In such a case, the at least one base entity information may be a section of a text having the name of drug given to the subject is. As an example, if a text in the clinical trials data reads "Name of the subject is X. Subject X is given Y 10 mg for 5 days". The at least one base entity information obtained may read "Y 10 mg for 5 days".

Throughout the present disclosure, the term "plurality of base entity units" used herein relates to an element used to form the at least one base entity information and typically written with a space on either side. It will be appreciated that the plurality of base entity units constitutes for the at least one base entity information. As mentioned in above example, the at least one base entity information may read "Y 10 mg for 5 days". In such an example, the plurality of base entity comprises "Y", "10", "mg", "for", "5", and "days".

Optionally, the algorithm used in refining the target data comprises at least one of natural language processing, text analytics and machine learning techniques. Furthermore, natural language processing, text analytics and machine learning may be used in order to perceive contextual (namely, semantic, inferred) meaning of various words in the target data. Furthermore, aforementioned techniques analyse the words in the target database in order to identify contextual meaning thereof. Moreover, co-occurrence of the words of the target data may be checked. Furthermore, co-occurrence of words present in the target data refers to use of the aforementioned words of the target data together in order to convey information. Additionally, optionally, the processing module is operable to refine the target data by employing the aforesaid algorithm. Furthermore, the processing module employs learning and/or a data mining technique on the target data in order to refine (such as, detecting misspellings) the target data.

Optionally, refining of the target data comprises removing stock entity units from the at least one base entity information. The stock entity units generally include the words representing prepositions, articles, verb, adjectives and the like. In such a case, the stock entity units are predefined by the user and are stored in the processing module. In operation, the processing unit is operable to compare the each of the plurality of base entity units to the stock entity units. In such a case, the processing module removes the stock entity units from the at least one base entity information. In an example, if the target data comprises "Subject X is given Y 10 mg for 5 days", the base entity units may be "X", "is", "Y", "10", "mg", "for", "5" and "days". In such an example, the processing module compares the base entity units and determines that the base entity units: "is" and "for", are present in the stock entity units. Consequently, the base entity units "is" and "for" are removed from the obtained at least one base entity information. Therefore, the base entity information now comprises "Y 10 mg 5 days".

As mentioned previously, the method of extracting entity information from target data comprises generating the plurality of strings for each of the base entity information, wherein the plurality of strings comprises the at least one base entity unit among the plurality of base entity units. Specifically, the processing module is operable to generate the plurality of strings for each of the base entity information.

Throughout the present disclosure, the term "plurality of strings" used herein relates to a set of strings, wherein each string comprises at least one base entity unit. It will be appreciated that the plurality of strings may comprise one base entity unit, two base entity units, three base entity units and so forth. Furthermore, the plurality of base entity units is arranged in any combination thereof. In operation, the plurality of base entity units corresponding to each of the at least one base entity information is analysed. Thereafter, the plurality of strings is generated for the each of the at least one base entity information. Optionally, the plurality of strings may include strings that only have the base entity unit occurring in a contiguous manner.

In an example, the at least one base entity information obtained from the clinical trial data may comprise "XYZ 10 mg". In such an example, the processing module analyses the base entity information "XYZ 10 mg" and generates plurality of strings. In this case, since number of plurality of base entity unit is three ("XYZ", "10" and "mg"), the number of plurality of strings are seven. The plurality of strings generated may be "XYZ 10 mg", "XYZ 10", "10 mg", "XYZ mg", "XYZ", "10" and "mg".

In another example, the at least one base entity information obtained from the clinical trial data may comprise "XYZ 10 mg daily". In such an example, the processing module analyses the base entity information "XYZ 10 mg" and generates plurality of strings. In this case, since number of plurality of base entity unit is four ("XYZ", "10", "mg" and "daily"), the number of plurality of strings are 15. The plurality of strings generated may be "XYZ 10 mg daily", "XYZ 10 mg", "XYZ 10, daily", "10 mg daily", "XYZ mg daily", "XYZ, 10", "XYZ, mg", "XYZ, daily" "10 mg", "10 daily", "mg daily", "XYZ", "10", "mg" and "daily". Furthermore, in an embodiment, the plurality of strings comprising base entity units in a contiguous manner may be "XYZ 10 mg daily", "XYZ 10 mg", "10 mg daily", "XYZ, 10", "10 mg", "mg daily", "XYZ", "10", "mg" and "daily".

Furthermore, optionally, the plurality of strings for each of the base entity information is generated based on an n-gram model. It will be appreciated that the n-gram model relates to a contiguous sequence of 'n' items from a given at least one base entity information, wherein 'n' represents number base entity units within the plurality of strings. In this regard, the string having one base entity unit is referred as unigram or one-gram, the string having two base entity units are referred as bigram or two-gram, the string having three base entity units are referred as trigram or three-gram. Similarly, based on the number of the plurality of base entity units, the plurality of strings is referred as "four-gram", "five-gram", and so on.

For sake of clarity, the above-mentioned example is explained below with respect to the n-gram model. In the aforementioned example, the plurality of strings generated may be "XYZ 10 mg daily", "XYZ 10 mg", "XYZ 10, daily", "10 mg daily", "XYZ mg daily", "XYZ, 10", "XYZ, mg", "XYZ, daily" "10 mg", "10 daily", "mg daily", "XYZ", "10", "mg" and "daily". In such an example, the string "XYZ 10 mg daily" is the four-gram. Similarly, the strings "XYZ 10 mg", "XYZ 10, daily", "10 mg daily", and "XYZ mg daily" could be the trigram or three-gram, the strings "XYZ, 10", "XYZ, mg", "XYZ, daily" "10 mg", "10 daily", and "mg daily" could be bigram or two-gram and the strings "XYZ", "10", "mg" and "daily" could be unigram or one-gram.

As mentioned previously, the method of extracting entity information from target data comprises sorting the plurality of strings in the decreasing order of the length of the plurality of strings. Specifically, the processing module is configured to sort the plurality of strings. Furthermore, the plurality of strings is sorted to categorize the plurality of strings in a specific order. Moreover, the plurality of strings is sorted based on a specific criterion of decreasing order of the length of the plurality of strings. Examples of sorting algorithms used for sorting the plurality of strings includes at least one of: Bubble sort, Insertion Sort, Selection sort, Quick sort, Merge sort. It is to be understood that the sorting algorithm are employed in a manner such that the plurality of strings is sorted in decreasing order of the length of the plurality of strings.

In an embodiment, the plurality of strings of same length are sorted based on alphabetical order. In another embodiment, the plurality of strings of same length are sorted based on reverse alphabetical order. In yet another embodiment, the plurality of strings of same length are grouped together in a random order.

Optionally, sorting the plurality of strings comprises segmenting the plurality of strings into at least one segment based on the length of the plurality of strings, wherein each segment comprises at least one string of a specific length. Further, the at least one segment is arranged in a decreasing order based on length of the segment.

Optionally, the length of a string corresponds to a number of base entity units in the string. For example, the plurality of strings comprises three strings (namely, a first string, a second string and a third string). In such an example, the first string, the second string and the third string may comprise three base entity units, two base entity units and one base entity unit respectively. In such a case, the length of the first string, the second string and the third string could be three, two and one respectively. In this regard, when sorted, the first string is arranged firstly and the second string is arranged after the first string. Similarly, the third string is arranged after the second string.

As mentioned previously, the method of extracting entity information from target data comprises identifying the entity type of the plurality of strings, based on the ontology, by processing the plurality of strings sequentially. Specifically, the processing module is configured to identify the entity type of the plurality of strings. Furthermore, the ontology provides a basis for identifying and analysing the conceptual meaning of plurality of strings. Furthermore, identified semantics associations from the ontology are used to establish links (namely, relationship, association and so forth) between the plurality of base entity units. Beneficially, the semantic associations provide a conceptually organized, assembled and easily accessible set of base entity units. It is to be understood that the associations established between the plurality of base entity units allows for determining the entity type of plurality of base entity units. Furthermore, the plurality of strings is processed in a manner such that the string with highest length is analysed first, the string with next highest length will be analysed thereafter and so forth. Furthermore, the plurality of base entity units of the plurality of strings are processed sequentially. It will be appreciated that the term "entity type" used herein relates to a specific field to which the base entity unit is associated with.

Throughout the present disclosure, the term "ontology" relates to a set of concepts (namely, information, ideas, data, semantic associations and so forth) in a field (namely, subject area, domain and so forth) that comprises entity types and properties of the set of concepts and semantic association thereof. Moreover, ontology provides a structured, optimal and relevant set of concepts pertaining to the user's field of interest. Furthermore, the ontology may be used in scientific research, academic studies, market analysis and so forth. Optionally, the ontology may include concepts in form of text, image, audio, video, or any combination thereof. Additionally, the ontology may provide information on how a certain concept in a certain field may be associated with one or more concept in multiple fields.

In operation, the plurality of base entity units is linked with corresponding entity present in the ontology. The entity type of the entity (stored in the ontology) is determined and consequently that entity type is provided to the corresponding base entity unit. In an example, the plurality of base entity units refined from the clinical trial data (namely, the target data) may comprise "ABC" "20" and "mg", wherein "ABC" is the name of the drug given to the subject. The generated plurality of strings may be "ABC 20 mg", "ABC 20", "20 mg", "ABC", "20" and "mg". The string "ABC 20 mg" is analysed first based on the ontology. If the string "ABC 20 mg" represent an already known drug, the entity type may be determined by analysing this string only. In such a case, the entity type of the string "ABC 20 mg" is determined as [drug name] for "ABC" and [dosage] for "20 mg".

However, if a string "ABC 20 mg" represents a drug that is being researched on, or the drug is not present in the ontology, the entity type may not be determined by analysing this string only. Further, in such an example, the strings with next highest length (for example, such as "ABC 20", and "20 mg") will be analysed based on the ontology. It will be appreciated that the "ABC mg" is discarded since the base entity units are not in sequential order. The strings "ABC 20" and "ABC mg" may not correspond to any of the data present in the ontology. Therefore, entity type may not be identified using these strings. On the other hand, the string "20 mg" may correspond to the data corresponding to the [dosage] in the ontology. Therefore, the entity type of string "20 mg" is identified as [dosage]. Thereafter, the strings with next highest length (such as strings "ABC", "20" and "mg") are analysed. The entity type of the string "ABC" may not be identified using ontology. Therefore, the entity type of the string "ABC" is identified as [NA].

Optionally, the method of extracting entity information from target data comprises: developing the ontology using at least one curated database by: applying conceptual indexing to plurality of entity units stored in the at least one curated database; identifying semantic associations, between the plurality of entity units, established in the at least one curated database; and identifying at least one class tagged with the plurality of entity units in the at least one curated database.

Optionally, field of the at least one curated database is related to the developed ontology. Specifically, the at least one curated database may comprise information providing details on associations between a plurality of concepts. Additionally, the ontology is developed to include relevant information extracted from the at least one curated database pertaining to the field of user's interest. Optionally, the at least one curated database includes information in form of text, image, audio, video, or any combination thereof.

In an example, at least one curated database may comprise information related to biomedical entities, genes, proteins, drugs, diseases, species, pathways, biological processes, molecular functions, side effects, drug labels, clinical trial parameters, patient demographics and many other semantic types thereof. Furthermore, the at least one curated database may be extracted to build a Life Science ontology (including custom dictionary and meta-thesaurus) containing synonyms, derivational and functional form of different biomedical entities as well as Medical Subject Headings (MeSH). Furthermore, optionally, the at least one curated database and ontology extracted from thereof may include data about Authors, geography and other biological and non-biological entities.

In an embodiment, developing an ontology using at least one curated database comprises applying conceptual indexing to data-records stored in the at least one curated database, wherein the data-records may include a plurality of data-units. Optionally, conceptual indexing may include parsing of plurality of data-units of the at least one curated database. Furthermore, parsing may generate one or more conceptual structure representing assembly of the plurality of data-units to construct a relation therebetween. Moreover, conceptual indexing may be applied to data-records to identify contextual meaning thereof. Beneficially, data-records may be organized based on conceptual indexing thereof. Optionally, data-records may be a set of information related to an entity, object and so forth. Furthermore, each individual piece of information about the object and so forth may form a data-unit. In an example, at least one curated database may include information related to books, author name, publication and so forth. Furthermore, data-records stored in the at least one curated database may include information about one or more books. Moreover, data-records corresponding to one or more books may include data units pertaining to the one or more books (namely, book name, author name, publication and so forth).

In an embodiment, developing an ontology using at least one curated database comprises identifying semantic associations between the plurality of data-units, established in the at least one curated database. Furthermore, associations (namely relations, links and so forth) among the plurality of data-units may be identified based on the conceptual indexing applied to data-records stored in the at least one curated database. Beneficially, identifying semantic associations provide contextual (namely, inferred) relationships of the plurality of data-units. Optionally, the semantic associations established in the at least one curated database are identified using at least one of: knowledge-based text mining, natural language processing. Furthermore, knowledge-based text mining provides semantic association between the plurality of data-units based on identifying and analysing known information and associations.

Throughout the present disclosure, the term "class" relates to a collection (namely, cluster, group and so forth) of contextually similar text, audio, video, image or a combination thereof. Furthermore, the class may include many synonyms, abbreviations, linguistic and lexical variations, morphological forms and/or derivational entities for the plurality of data-units associated therewith. In an example, "pain" may be associated with a class containing similar entities like cramp, ache, discomfort, spasm and so forth.

In an embodiment, developing an ontology using at least one curated database comprises: identifying at least one class tagged with the plurality of data-units in the at least one curated database. Furthermore, data-records may be included in the at least one class (namely, group, cluster and so forth) based on contextual similarity thereof. In an example, at least one class may be recognized by a traditional indexer using tf-idf (term frequency-inverse document frequency) weighting method. Additionally, tf-idf may act as a numerical statistic that may be intended to reflect how important a word may be to a document in a collection. Optionally, tf-idf may be used as a weighting factor (namely, provides notion of importance) in information retrieval, text mining and so forth. Furthermore, the class may be an organized set of data-units comprising elements of data having a similar contextual meaning pertaining to the field of user's interest.

As mentioned previously, the method of extracting entity information from target data comprises assigning the labels to the plurality of strings based on the entity type. Specifically, the processing module is operable to assign the labels to the plurality of strings based on the entity type. In an embodiment, labelling the one or more segments refers to associating an identifier with the plurality of strings. Beneficially, the labelling of the plurality of strings provide a more specific and structured form thereof. Optionally, the labelling of the plurality of strings may be in form of text, symbols, icons and so forth. Furthermore, labelling of the plurality of strings based on the entity type represent multiple order, category and/or division of information. Beneficially, the labelling provides information about the form, order and type of information within the plurality of strings. In an example, for clinical trial data, the entity type may be classified as dosage, unit, drug name and so forth.

It will be appreciated that the labelled plurality of strings comprises plurality of base entity units with different entity type. Furthermore, plurality of strings of a similar label may be merged into a parent label. For example, the strings "milligram" and "gram" both may be labelled as [unit]. Similarly, the strings related different organs of the human body may be labelled as [body part]. Beneficially, associating features with labelled plurality of strings reduces chances of misinterpretation of labelled plurality of strings. In an example, labelled plurality of strings may contain an element 'India' that may refer to name of a person. Therefore, associating the plurality of strings containing element "India" with a base entity unit labelled with a user-specified class 'people' may reduce the chances of misinterpreting it with name of a country.

As mentioned in a previous example, the generated plurality of strings was "ABC 20 mg", "ABC 20", "20 mg", "ABC", "20" and "mg" for a clinical trial data, wherein "ABC" is a known drug stored in the ontology. In such an example, the string "ABC" is labelled as 'drug name', "20" is labelled as 'dosage' and the string "mg" may be labelled as 'unit'. However, if the string "ABC" is a drug that is not present in the ontology, the string "ABC" is labelled as 'NA'.

As mentioned previously, the method of extracting entity information from target data comprises mapping the labelled plurality of strings to a predefined signature to obtain the entity information. Specifically, the processing module is operable to map the labelled plurality of strings to the predefined signature. Optionally, the predefined signature is stored in the memory unit of the processing module. Moreover, optionally, the predefined signature is provided by the user. Furthermore, optionally, user may provide plurality of predefined signatures. In such a case, the labelled plurality of string is processed with each of the predefined signature of the plurality of predefined signature.

Throughout the present disclosure, the term "predefined signature" used herein relates to a predefined pattern of entity type. In operation, the plurality of strings with labelled entity type are processed for identifying a pattern similar to the predefined signature. Beneficially, such operation of the predefined signature and the plurality of string allows for extracting entity information even if it is randomly arranged in the target data.

Optionally, spatial, content and structural features of the labelled plurality of strings are mapped to the predefined signature. Furthermore, optionally, the processing module may be operable to associate the spatial, content and structural features to the labelled plurality of strings by calculating the location, context and layout of the predefined signature. Beneficially, the mapping of the spatial, content and structural features to the labelled plurality of strings makes the task of ordering and/or classifying entity information efficient.

Optionally, the predefined signature is defined based upon a predefined arrangement of the entity types. In an example, the entity types for extracting the entity information for a drug that is not present in the ontology may be 'Drug name', 'dosage', 'units' and 'frequency'. In such an example, the entity types of the predefined signature may be positioned in various arrangements. In first case, the predefined signature may be defined in following order:
'Drug name'→'dosage'→'units'→'frequency'
In second case, the predefined signature may be defined in following order:
'dosage'→'units'→'Drug name'→'frequency'
In third case, the predefined signature may be defined in following order:
'Drug name'→'frequency'→'dosage'→'units'
Similarly, any possible arrangement of the entity type can be used to define the predefined signature.

Optionally, the mapping of the labelled plurality of strings comprises removing entity units stored in a curated English corpus from the at least one base entity information. Specifically, the curated English corpus may comprise general English words that may occur in predefined signature. Optionally, the curated English corpus includes information in form of text, image, audio, video, or any combination thereof. Furthermore, curated English corpus may not comprise English words commonly used in information related to biomedical entities, genes, proteins, drugs, diseases, species, pathways, biological processes, molecular functions, side effects, drug labels, clinical trial parameters, patient demographics and many other semantic types thereof.

Optionally, the labelled plurality of strings are processed with the curated English corpus. Thereby, the entity units that matches the English words present in the curated English corpus are removed to obtain the at least one base entity information.

In an example, if the target data comprises "take MED in a dose of 5 mg daily after dinner", wherein "MED" is the name of the drug given to the subject. The plurality of base entity units may be "take", "MED", "in", "a", "dose", "of", "5", "mg", "daily", "after" and "dinner". In such an example, the processing module compares the base entity units and determines that the base entity units "in", "a", and "of" are present in the stock entity units. Consequently, the base entity units "in", "a", "after" and "of" are removed from the obtained at least one base entity information. Therefore, the base entity information now comprises "take MED dose 5 mg daily dinner". In such an example, the processing module analyses the base entity information "take MED dose 5 mg daily dinner" and generates plurality of strings. In this case, since number of plurality of base entity unit is seven ("take", "MED", "dose", "5", "mg", "daily", and "dinner"), the number of plurality of strings are twenty eight. The plurality of strings generated may be "take MED dose 5 mg daily dinner", "take MED dose 5 mg daily", "MED dose 5 mg daily dinner", "take MED dose 5 mg", "MED dose 5 mg daily", "dose 5 mg daily dinner", "take MED dose 5", "MED dose 5 mg", "dose 5 mg daily", "5 mg daily dinner", "take MED dose", "MED dose 5", "5 mg daily", "mg daily dinner", "take MED", "5 mg", "take", "MED", "dose", "5", "mg", "daily", "dinner" and so forth. This plurality of strings, are arranged in decreasing order of length such that string "take MED dose 5 mg daily dinner" (length of 7 base entity units) is arranged first, then the string "take MED dose 5 mg daily", "MED dose 5 mg daily dinner" are arranged. Thereafter, the base entity units of next highest length are arranged in a similar manner. The string "MED 5 mg" is analysed first based on the ontology. In such an example, if the string "MED 5 mg" represent an already known drug, the entity type may be determined by analysing this string only. In such a case, the string with highest length will be analysed based on the ontology to identify the entity type thereof and thereafter the string with next highest length will be analysed to identify the entity type thereof. The string "5 mg" may correspond to the data corresponding to the [dosage] in the ontology. Furthermore, the base entity unit "take" may be removed based on the curated English corpus. Moreover, the base entity units such as "daily", "dinner", "dose" may be identified as [frequency], [timing] and [dose] respectively. The entity type of the string "MED" may not be identified using ontology. Therefore, the entity type of the string "MED" is identified as [NA]. Thereafter, corresponding labels is assigned to the plurality of strings such as the strings "5 mg" is labelled as [dosage] and the string "MED" is labelled as [NA]. It will be appreciated that all of the strings mentioned above will be labelled accordingly although a limited number of strings are shown here with labels. Furthermore, in such an example, the predefined signature may be [drug name]→[dosage]→[frequency]. In this regard, the base entity units "take", "dose", and "dinner" are removed as they are found to be present in the curated English corpus. Consequently, the plurality of strings comprises "MED", "5 mg", "daily". This plurality of strings, are then mapped with the predefined signature to obtain the entity information as shown below:
"MED"-[drug name]→"5 mg"-[dosage]→"daily"[frequency].

Optionally, the method further comprises classifying the obtained entity information based on the ontology. It will be appreciated that a summary of the obtained at least one base entity information is generated. Optionally, the summary may provide all of the obtained at least one base entity information. Alternatively, optionally, the summary may provide only that base entity information which were not present in the ontology. In yet another embodiment, the summary may provide all of the base entity information listed under different groups. For example, the at least one base entity information that is not present in the ontology may be listed under group named "not known information". Similarly, the at least one base entity information that is present in the ontology may be listed under group named "known information".

Furthermore, there is disclosed a computer readable medium, containing program instructions for execution on a computer system, which when executed by a computer, cause the computer to perform method steps for extracting entity information from target data. The method comprising the steps of providing the target data; refining the target data to obtain at least one base entity information having a plurality of base entity units using an algorithm, wherein the algorithm is based on a predefined syntax; generating a plurality of strings for each of the base entity information, wherein the plurality of strings comprises at least one base entity unit among the plurality of base entity units; sorting the plurality of strings in a decreasing order of length of the plurality of strings; identifying an entity type of the plurality of strings, based on an ontology, by processing the plurality of strings sequentially; assigning labels to the plurality of strings based on the entity type; and mapping the labelled plurality of strings to a predefined signature to obtain the entity information.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated is a block diagram of a system 100 for extracting entity information from target data, in accordance with an embodiment of the present disclosure. The system 100 comprises a database arrangement 102 operable to store the target data and ontology; a processing module 104 communicably coupled to the database arrangement 102. The processing module 104 is operable receive the target data from the database arrangement 102 and extracting entity information therefrom.

Figure 2:
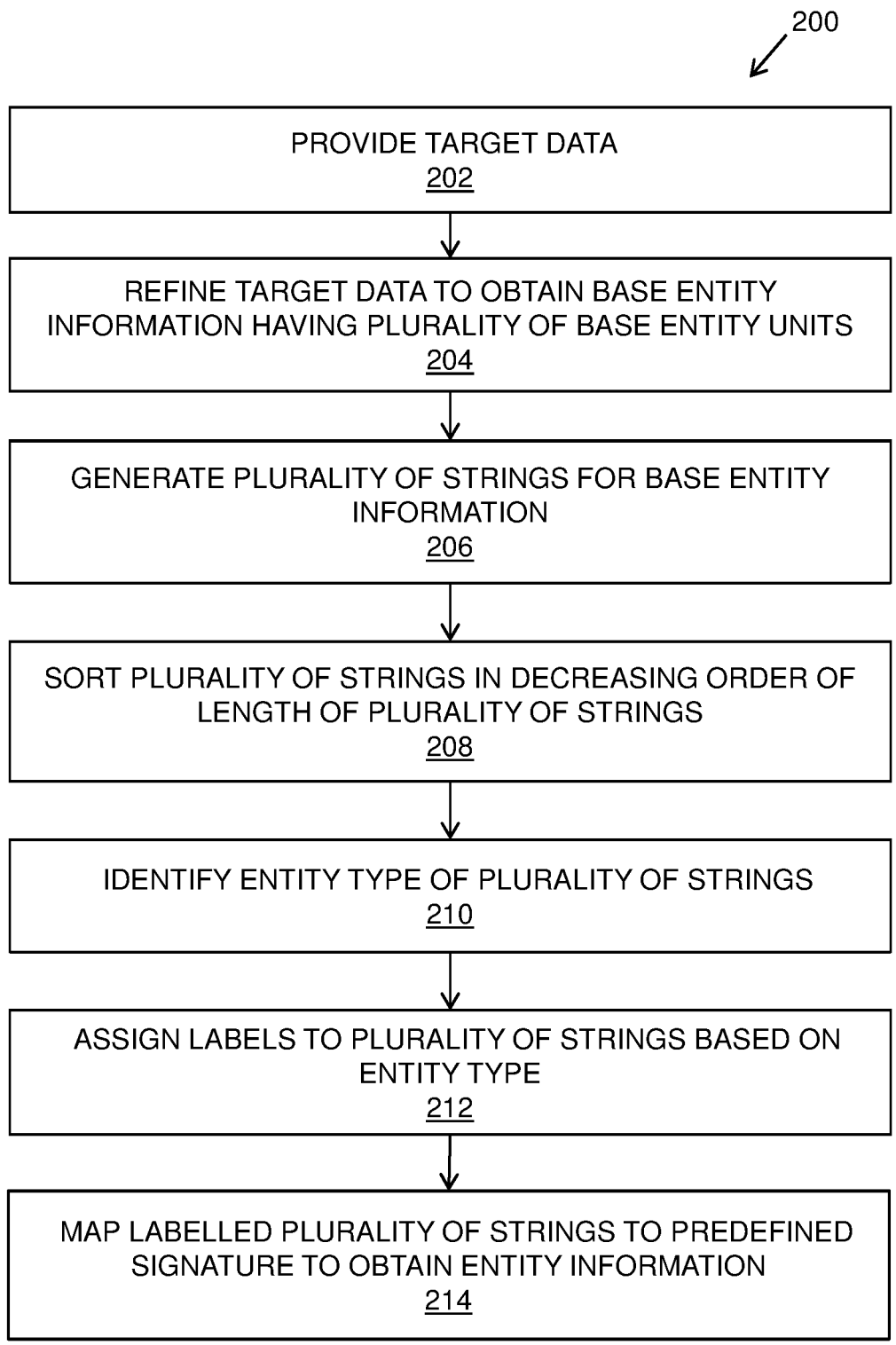
FIG. 2 is an illustration of steps of a method for extracting entity information from target data, in accordance with an embodiment of the present disclosure.

Referring to FIG. 2, illustrated are steps of a method 200 of extracting entity information from target data, in accordance with an embodiment of the present disclosure. At a step 202, the target data is provided. At a step 204, the target data is refined to obtain at least one base entity information having a plurality of base entity units using an algorithm, wherein the algorithm is based on a predefined syntax. At a step 206, a plurality of strings is generated for each of the base entity information. The plurality of strings comprises at least one base entity unit among the plurality of base entity units. At a step 208, the plurality of strings is sorted in a decreasing order of length of the plurality of strings. At a step 210, an entity type of the plurality of strings is identified based on an ontology by processing the plurality of strings sequentially. At a step 212, labels are assigned to the plurality of strings based on the entity type. At a step 214, the labelled plurality of strings is mapped to a predefined signature to obtain the entity information.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of extracting entity information from target data, wherein the method comprises:
    providing the target data;
    refining the target data to obtain a plurality of base entity units, wherein the target data is refined using an algorithm;
    generating a plurality of strings based on the plurality of base entity units, wherein the plurality of strings comprises one or more base entity unit among the plurality of base entity units;
    sorting the plurality of strings in a decreasing order of length;
    processing the sorted plurality of strings sequentially to identify one or more entity types and establish links between the one or more base entity units of the plurality of base entity units, wherein the entity type refers to a specific field to which the base entity unit is associated with, and wherein the entity type and the established units are identified based on an ontology;
    assigning labels to the one or more entity types;
    mapping the labelled one or more entity types to a predefined signature, wherein the predefined signature relates to a predefined arrangement of the entity types;
    processing the plurality of strings with labelled entity type to identify a pattern similar to the predefined signature; and
    extracting entity information based on the operation of the predefined signature and the plurality of strings.

2. The method of claim 1, wherein the method further comprises classifying the obtained entity information based on the ontology.

3. The method of claim 1, wherein the length of a string corresponds to a number of base entity units in the string.

4. The method of claim 1, wherein the method comprises developing the ontology using at least one curated database by:
    applying conceptual indexing to plurality of entity units stored in the at least one curated database;
    identifying semantic associations, between the plurality of entity units, established in the at least one curated database; and
    identifying at least one class tagged with the plurality of entity units in the at least one curated database.

5. The method of claim 1, wherein the algorithm used in refining the target data comprises at least one of: natural language processing, text analytics and machine learning techniques.

6. The method of claim 1, wherein the refining of the target data comprises removing stock entity units from the at least one base entity information.

7. The method of claim 1, wherein the mapping of the labelled plurality of strings comprises removing entity units stored in a curated English corpus from the at least one base entity information.

8. A system for extracting entity information from target data, wherein the system comprises:
    a database arrangement operable to store the target data and an ontology; and
    a processing module communicably coupled to the database arrangement, the processing module operable to:
    receive the target data;
    refine the target data to obtain a plurality of base entity units, wherein the target data is refined using an algorithm;
    generate a plurality of strings based on the plurality of base units, wherein the plurality of strings comprises one or more base entity unit among the plurality of base entity units;
    sort the plurality of strings in a decreasing order of length;
    processing the sorted plurality of strings sequentially to identify one or more entity types and establish links between the one or more base entity units of the plurality of base entity units, wherein the entity type refers to a specific field to which the base entity unit is associated with, and wherein the entity type and the established units are identified based on the ontology;
    assign labels to the one or more entity types; and map the labelled one or more entity types to a predefined signature, wherein the predefined signature relates to a predefined arrangement of the entity types;

process the plurality of strings with labelled entity type to identify a pattern similar to the predefined signature; and extract entity information based on the operation of the predefined signature and the plurality of strings.

9. The system of claim 8, wherein the processing module is further operable to classify the obtained entity information based on the ontology.

10. A non-transitory medium, containing program instructions for execution on a computer system, which when executed by a computer, cause the computer to perform method steps for extracting entity information from target data, the method comprising the steps of:

providing the target data;

refining the target data to obtain a plurality of base entity units, wherein the target data is refined using an algorithm;

generating a plurality of strings based on the plurality of base entity units, wherein the plurality of strings comprises one or more base entity unit among the plurality of base entity units;

sorting the plurality of strings in a decreasing order of length;

processing the sorted plurality of strings sequentially to identify one or more entity types and establish links between the one or more base entity units of the plurality of base entity units, wherein the entity type refers to a specific field to which the base entity unit is associated with, and wherein the entity type and the established units are identified based on an ontology;

assigning labels to the one or more entity types;

mapping the labelled one or more entity types to a predefined signature, wherein the predefined signature relates to a predefined arrangement of the entity types;

processing the plurality of strings with labelled entity type to identify a pattern similar to the predefined signature; and extracting entity information based on the operation of the predefined signature and the plurality of strings.

* * * * *